United States Patent [19]
Baker

[11] 3,844,841
[45] Oct. 29, 1974

[54] MODULAR BATTERY CONSTRUCTION
[75] Inventor: Bernard Baker, Brookfield, Conn.
[73] Assignee: Energy Research Corporation, Bethel, Conn.
[22] Filed: Dec. 29, 1972
[21] Appl. No.: 319,913

[52] U.S. Cl............. 136/111, 136/134 R, 136/166, 136/181
[51] Int. Cl. ........................................... H01m 1/02
[58] Field of Search.................... 136/111, 108–110, 136/166, 171–173, 120 R, 58–59, 135 R, 135 S, 181

[56] References Cited
UNITED STATES PATENTS

| | | |
|---|---|---|
| 2,463,089 | 3/1949 | Deibel................................ 136/111 |
| 2,475,152 | 7/1949 | Rock................................... 136/111 |
| 2,579,743 | 12/1951 | Kurlandsky...................... 136/111 X |
| 2,666,802 | 1/1954 | Woodring et al.................... 136/111 |
| 2,987,569 | 6/1961 | Lang................................... 136/111 |
| 3,282,737 | 11/1966 | Hintermann et al.......... 136/120 FC |
| 3,441,447 | 4/1969 | Hartop.............................. 136/166 |
| 3,442,709 | 5/1969 | Hayase........................... 136/111 X |
| 3,536,537 | 10/1970 | Solomon........................ 136/120 R |
| 3,553,020 | 1/1971 | Corbin et al.................. 136/166 X |
| 3,560,262 | 2/1971 | Baba et al............................. 136/76 |

Primary Examiner—Anthony Skapars
Attorney, Agent, or Firm—Watson Leavenworth Kelton & Taggart

[57] ABSTRACT

A modular battery construction comprising one or more cells, each cell having positive and negative electrodes formed by parallel, thin sheets of porous, inert material impregnated with finely divided electrode materials, and a thin sheet of porous inert material impregnated with electrolyte is sandwiched between the electrodes. A stack of cells is mounted in each casing, which casings are nestable together in any desired number. Each casing has an end wall and a peripheral side wall adapted to nestingly engage the side wall of an adjacent casing.

8 Claims, 8 Drawing Figures 3,844,841

MODULAR BATTERY CONSTRUCTION

The present invention relates to a modular battery construction and more particularly to a modular battery construction wherein new and improved thin flat energy cells are arranged in stacks within modular casings, which casings are adapted to be nested together with other casings thereby forming a battery construction having widely variable selected operating characteristics of voltage and amperage. The cells of each casing are connected either in series or parallel with those of the next casing to provide the desired battery characteristics.

It is an object of the present invention to provide a new and improved modular battery construction.

More particularly, it is an object of the present invention to provide a new and improved modular battery construction having novel cell construction wherein the cells comprise thin, flat, multi-layer, wafer-like structures arranged in a stack.

Yet another object of the present invention is to provide a new and improved battery construction wherein a plurality of said thin, flat wafer-like cells are arranged in a stack, which stack is seated within a modular casing, which casing is adapted to be nested with a next adjacent casing and the stack of cells in the casing electrically connected in series or parallel to provide the desired voltage and amperage capacity.

Another object of the invention is to provide a new and improved electrode construction for a battery cell including a substrate of thin porous, inert sheet material impregnated with electrode material.

Another object of the invention is to provide a new and improved battery cell wherein the substrate of the cell comprises a thin, flat, sheet of porous inert material such as polytetrafluoroethylene ("Teflon") formed with strands for holding the electrode material.

The foregoing and other objects and advantages of the present invention are accomplished in a new and improved modular battery construction comprising one or more cells, each cell having positive and negative electrodes formed of parallel thin flat sheets of porous, inert material for supporting electrode material impregnated therein. A similar sheet of thin, flat, porous inert material is impregnated with electrolyte material and is sandwiched between the electrodes to form a thin wafer-like cell construction. The cells are arranged in a stack and a stack is mounted within a modular casing of inert material having an end wall for supporting one side of a cell stack and a peripheral side wall extends around the end wall and includes opposite edges adapted to nestingly engage the sidewall of adjacent casings. Any number of casings may be interconnected in nested relation and the cell stacks within each casing may be connected in series or parallel by means of terminals mounted on the casing end walls in order to provide the desired voltage and amperage characteristics for the battery.

Reference should be had to the following detailed description when taken in conjunction with the drawings in which.

Figure 1:
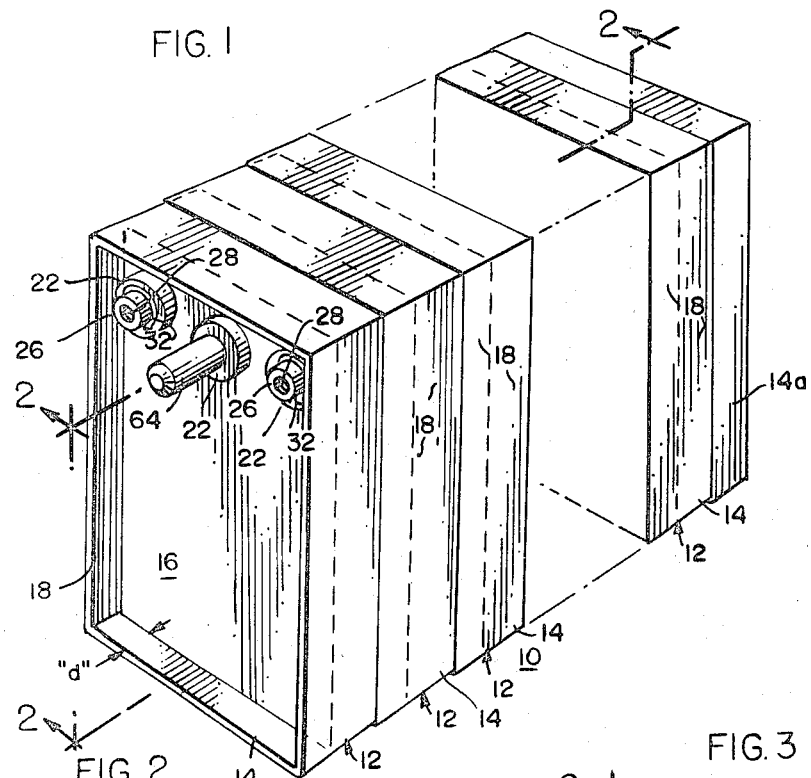
FIG. 1 is a perspective view illustrating a new and improved modular battery construction in accordance with the features of the present invention, with intermediate nested cell casings shown in phantom.
Figure 2:
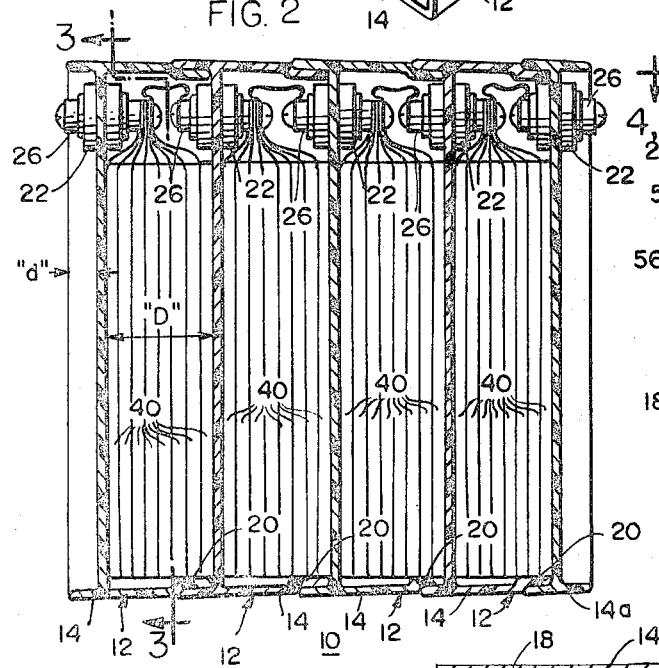
FIG. 2 is a longitudinal sectional view taken substantially along lines 2—2 of FIG. 1.
Figure 8:
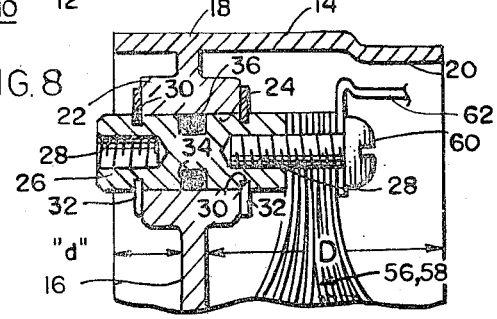
FIG. 8 is an enlarged fragmentary view taken substantially along lines 8—8 of FIG. 3 illustrating terminal connector means of the modular battery in accordance with the present invention.

Referring now more particularly to the drawings therein is illustrated a new and improved modular battery construction in accordance with the features of the present invention and referred to generally by the reference numeral 10. The modular battery 10 comprises a plurality of separate or individual, modular sections 12 adapted to be nested together in combination to provide the battery voltage and/or amperage characteristic desired. Each modular unit 12 comprises a housing member or casing 14 preferably formed of integrally molded, relatively chemically inert electrical insulating material such as "ABS" plastic resin which is high in mechanical strength, along with the mentioned desirable characteristics. In addition to "ABS" plastic (acrylonitrile-butadiene-styrene) the casings 14 may also be molded out of other thermoplastic resins such as polyvinyl chloride or polyvinyl acetate or a mixture of the two. Each of the module casings 14 is formed with a thin, flat, end wall 16, preferably of rectangular shape and having an integrally formed side wall extending transversely thereof around the entire periphery thereof. As best shown in FIG. 2, the peripheral side wall of each casing section 14 extends in a direction forwardly of the end wall 16 for a short distance d beyond the outer face thereof and also extends in an opposite direction, rearwardly of the end wall for a greater distance D in order to provide a sizeable, rectangular housing or enclosure for holding a stack of cells of the battery. As best shown in FIGS. 2 and 8, a rearward edge portion of the peripheral sidewall 18 of each casing member 14 is formed with an inwardly indented or offset shoulder 20 which shoulder is adapted to interfit in nested relationship with a forwardly extending peripheral wall portion of a next adjacent rearwardly nested module casing. As indicated in FIGS. 1, 2, 4 and 5, a rearward most modular casing 14a, may have its shoulder 20 trimmed off to reduce the depth of the protective enclosure or recess at the rearward end of the battery which contains no battery cells. The front end walls 16 of each modular casing 14 are rimmed or flanged around the periphery by the forwardly extending sidewall 18 and when a pair or more of the modular casings 14 are nested together as shown, one or more generally rectangular, cells containing hollow housings or enclosures are formed between the parallel end walls 16. Each housing thus formed contains a stack of battery cells which may be connected in parallel or series.

Figure 3:
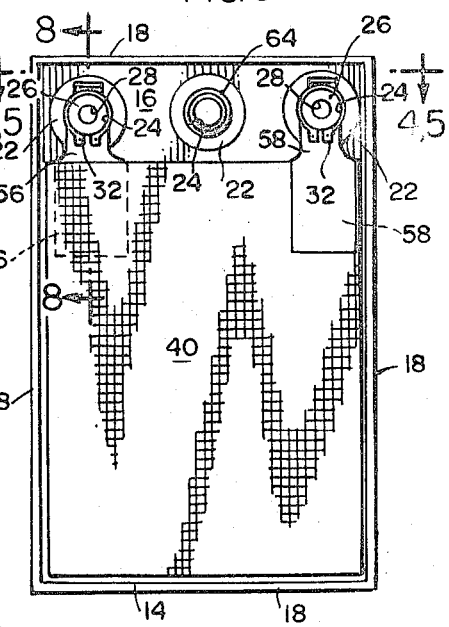
FIG. 3 is a transverse sectional view taken substantially along lines 3—3 of FIG. 2.

In order to aid in the electrical interconnection of the battery cells in adjacent, nested modular casings 14 the casing end walls 16 are formed with three cylindrical bosses 22 arranged on a line parallel and adjacent the upper edge of the wall. The bosses project both forwardly and rearwardly of the end wall as best shown in FIG. 8, and each boss 22 is formed with a concentric cylindrical bore 24. The bores may extend completely through the bosses as shown in FIG. 8 or may be closed off intermediate the opposite ends by a rupturable wall section which is integrally formed in the bore but is readily removable at a later time when desired. As best shown in FIGS. 3 and 8 the cylindrical bores 24 in the outer or outside bosses 22 on each casing may be provided with cylindrical terminal pins 26, having coaxially aligned, blind threaded bores 28 formed in each end. In order to lock the terminal pins in place within the bores 24 of the bosses 22, each pin is formed with a pair of longitudinally spaced apart, annular grooves 30 located intermediate of the opposite ends of the pin. Each groove is adapted to receive a C-type snap ring washer 32 as best shown in FIGS. 3 and 8 to prevent longitudinal movement of the pin in the bore. In order to provide gas tight sealing around the terminal pins 26 and the surface of the bores 24, each pin is formed with an annular groove 34 spaced between the grooves 30 for holding an O-ring 36 as shown in FIG. 8.

Figure 6:
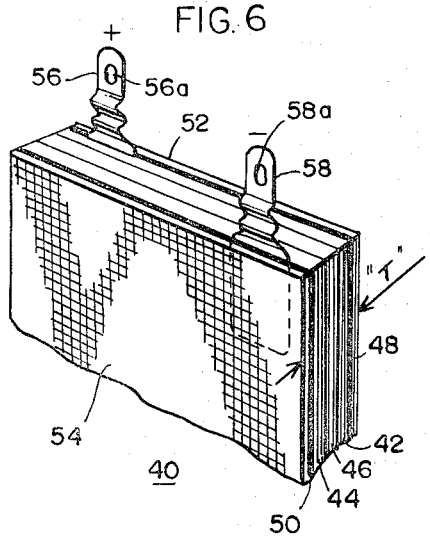
FIG. 6 is a fragmentary perspective view of a new and improved thin, multi-layer, wafer-like cell construction in accordance with the features of the present invention.

In accordance with the present invention, each module 12 and its casing 14 is adapted to contain and hold a plurality of thin, flat wafer-like battery cells 40 arranged in a rectangular stacked array and having a depth or stack thickness substantially equal to the depth D of the rearwardly extending portion of the casing side wall 18. In the illustrated examples each modular casing 14 is shown as containing eight of the thin, flat wafer-like battery cells 40 in a stack, however, the dimension D may be changed to accommodate a greater or smaller number of cells in a stack and the number of cells in a stack can also vary depend upon the thickness T (FIG. 6) of the wafer-like cells that are used as will be discussed in more detail hereinafter.

Each battery cell 40 is dimensioned to fit within the space bounded by the peripheral side wall 18 of the casings 14 and particularly since a stack of cells is inserted into a casing from the rear, the height and width dimensions of the cell stack is set up so that the stack of cells fit within the inset rear shoulder portion 20 of the casing side wall. In accordance with the present invention the battery cells 40 comprise a pair of thin, flat, parallel, sheet-like positive and negative electrodes 42 and 44 (FIG. 7) which are sandwiched on opposite sides of a thin-flat sheet impregnated with suitable electrolyte material. Opposite outer faces of the positive and negative electrodes 42 and 44 are provided with thin sheets 48 and 50, respectively, of electrically conductive metal foil or the like to carry current to and from the respective electrodes with respect to electrodes of adjacent cells. The positive and negative terminal sheets 48 and 50 in turn are insulated on the outside by thin, flat insulator sheets 52 and 54 which may comprise clear varnish or thin sheets of mica or the like. In order to provide for electrical interconnection between adjacent cells in the stacks, the positive terminal sheets 48 are provided with thin, flexible conductive connector tabs 56 along the upper edge, each tab having a slotted opening 56a therein, and similarly the negative terminal sheets 50 are provided with connector tabs 58.

Figure 7:
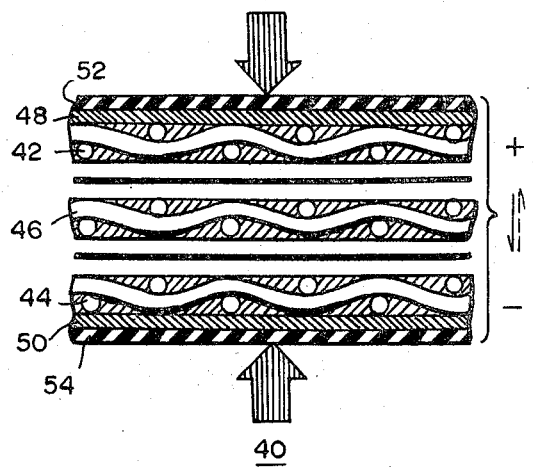
FIG. 7 is a greatly enlarged, fragmentary, schematic illustration showing in animated fashion details of construction of the individual wafer-like cells in accordance with the present invention.

The positive and negative electrodes 42 and 44 comprise a substrate formed of a thin, flat porous layer of relatively chemically inert material, such as stranded matted or woven polytetrafluoroethylene ("Teflon"). The porous sheet material substrates hold and support the electrode materials used in the cells and in the case of the positive electrode 42, electrode material such as finely divided lead, lead antimony or lead calcium (for a lead-acid type battery) or nickel oxide or silver oxide in an alkaline type battery is impregnated into the openings of the inert substrate. The "Teflon" substrate physically supports the electrode material of the positive electrode 42 for active chemical reaction with the electrolyte material in the substrate 46. The inert "Teflon" sheet may take the form of woven screen type material having small diameter strands woven together as in cloth as shown in FIG. 7 and having an overall layer thickness of approximately 0.020 inch to 0.035 inch. On the other hand, the substrate material can comprise a sheet-like thin, flat mat formed of random orientated strands of small diameter "Teflon" fibres. The negative electrode 44 comprises a similar substrate impregnated in electrode material such as a lead paste having inert material added thereto (in the case of a lead acid type storage battery), and in case of an alkaline type battery the material can comprise finely divided iron powder, cadmium or zinc. The intermediate or middle layer 46 which holds the electrolyte also comprises a thin, porous, sheet of "Teflon" which holds a suitable electrolyte such as sulphuric acid and water (in the case of a lead acid battery) or potassium hydroxide with a small amount of lithium hydroxide therein (in the case of an alkaline cell). The thin, flat electrode and electrolyte sheets are pressed or laminated together to form a multilayer, wafer-like battery cell 40 which normally may vary in thickness between approximately 0.090 inch and 0.120 inch. FIG. 7 indicates in somewhat animated fashion, the positive and negative electrodes 42 and 44 and the intermediate electrolyte layer 46 as they are sandwiched together between the outer terminal conductor foils 48 and 50 and the outer insulating layers 52 and 54.

Figure 4:
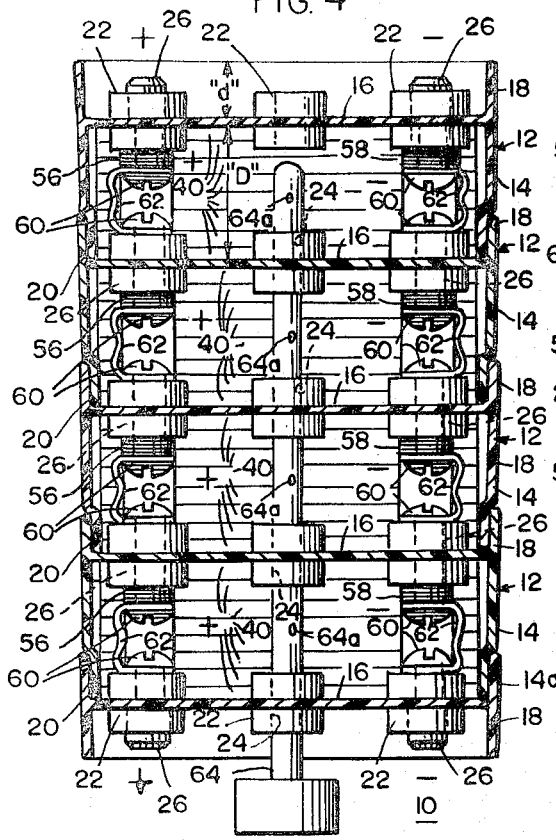
FIG. 4 is a longitudinal sectional view taken substantially along lines 4—4 of FIG. 3 illustrating a battery module with a parallel interconnection of the cell stacks in adjacent, nested casing modules.
Figure 5:
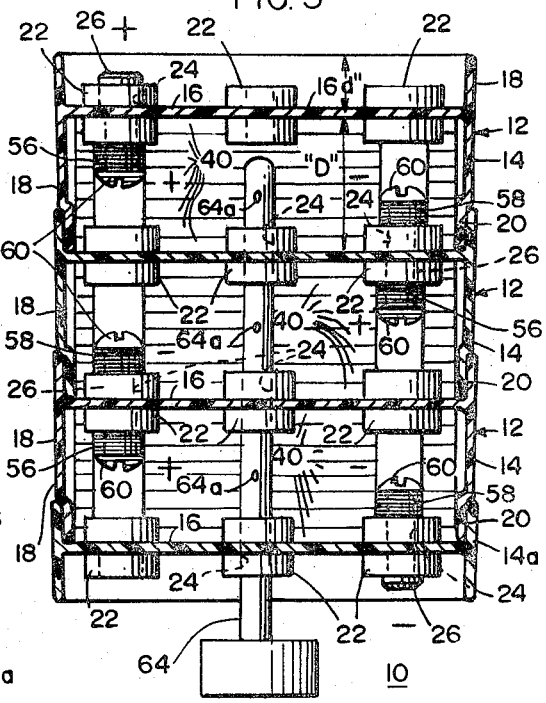
FIG. 5 is a longitudinal sectional view similar to FIG. 4 taken substantially along lines 5—5 of FIG. 3 but illustrating the cell stacks in adjacent nested casing modules as connected in series.

In accordance with the present invention, a plurality of cells 40 are positioned face to face forming a stack of cells, and the stack is then insulated into a modular casing 14. The tabs 56 and 58 of the cells in the stack are connected to the respective terminal pins 26 in a manner whereby the individual modules 12 may be connected in series as shown in FIG. 5 to provide high voltage or in parallel as shown in FIG. 4 to provide high amperage capacity. Referring to the parallel arrangement, it will be seen that terminal pins 26 are mounted in both the bosses adjacent the outside edges of the walls 16. As viewed in FIG. 4, the cells 40 in each casing 14 are arranged in the stack with the positive connector tabs 56 on the left hand side of the battery and the negative connector tabs 58 on the opposite right hand side. As best indicated in FIGS. 4 and 8, the connector tabs 56 and 58 are secured to the respective positive and negative terminal pins 26 by means of cap screws 60 which have shank portions extending through the slots 56a and 58a of the tab connectors and threaded into the threaded bores 28 of the terminals. Because each terminal pin 26 is provided with a pair of blind axial bores 28 extending inwardly from opposite ends, means is provided to interconnect the terminal pins on one modular casing 14 to the like terminals on the adjacent casing and for this purpose U-shaped jumper connectors 62 are attached to the pairs of axially aligned like terminals with the cap screws 60. The parallel cell arrangement shown in FIG. 4 provides a high amperage, low voltage battery and the power output may be taken from pairs of positive and negative terminal pins 26 at either end of the battery as desired.

Turning now to FIG. 5, a series cell arrangement is therein illustrated wherein the cells 40 in each stack are in parallel but each stack of cells in modular casing 14 is arranged to nest in alternate reverse order so that the stack of cells in the first module is connected in series with the cell stack (rather than in parallel) of the second and third modules, etc. In the first or forward module as shown in FIG. 5, the positive terminal pin 26 is located in the left hand boss 22 and the bores 24 of the other two bosses 22 are closed off and sealed and in the rear or last end module of the battery, only a negative terminal pin is provided in the right hand boss 22 while the other two bosses are closed off. The battery illustrated in FIG. 5 provides for high voltage with each cell stack connected in series with the stack in the next modular casing 14. A combination of series and parallel cell stack connections is readily obtained, for example by connecting a pair of parallel batteries of FIG. 4 in series with one another as taught by the construction of FIG. 5.

In accordance with the present invention in order to monitor the gas pressure in the nested modules 12, a pressure sensitive probe 64 is extended through the bores 24 in the axially aligned central bosses of the nested casings 14 of a battery module. The probe 64 includes an elongated hollow tube extending into each casing and projecting outwardly through the forward or rear end wall of the battery with a suitable indicator head on the outer end of the tube. O-ring seals are provided around the tubular probe within the bores 24 to seal between adjacent casings in a manner similar to that shown in FIG. 8 used for the terminal pins 26. Each casing 14 is in communication with the hollow tube of the elongated probe 64 through a pressure opening 64a as shown in the drawing.

When a modular battery construction 10 is assembled with a selected number and series or parallel arrangement of battery modules 12, the modular casings 14 with stacks of cells 40 therein are assembled together as described. A peripheral, gas-tight seal is formed between the forwardly extending portion of the peripheral side wall 18 of each casing and the rearward inset shoulder portion 20 of the next adjacent nested casing and this provides a plurality of speparate sealed modular cell chambers, each containing a stack of thin, flat battery cells 40 constructed in accordance with the features of this invention. The modular battery construction is light in weight, simple and flexible in construction and is useful in a wide variety of battery applications.

Although the present invention has been described with reference to a single illustrative embodiment thereof it should be understood that numerous other modifications and embodiments can be devised by those skilled in the art that will fall within the spirit and scope of the principles of this invention.

What is claimed as new and desired to be secured by letters patent of the United States is:

1. A modular battery comprising:
    a. a plurality of stacks of thin flat cells, each cell having a positive and a negative electrode plate and a thin sheet member containing an electrolyte disposed between such electrode plates;
    b. a plurality of nestable means for defining an outermost casing for said battery and for separately containing said cell stacks, each said nestable means comprising an end wall of wall area larger than the area of any one of said cell plates and sheet members and sidewalls supported on each edge of said end wall and extending beyond both sides thereof, the sidewalls of adjacent of said nestable means being engageable and thereupon defining with the end walls of said adjacent nestable means separate adjacent containers for said cell stacks, said end walls each defining an aperture therethrough, the end wall apertures of adjacent of said nestable means being axially aligned upon such engagement of said sidewalls; and
    c. pressure sensitive probe means for monitoring the gas pressures in said separate cell stack containers comprising hollow tube means extending through said end wall apertures for defining pressure-sensing openings extending from said hollow tube means into each of said separate containers.

2. The modulator battery claimed in claim 1 wherein each said cell comprises positive and negative electrode plates formed by parallel, thin sheets of porous, inert material impregnated with finely divided electrode material and a thin sheet of porous, inert material impregnated with said electrolyte.

3. The modular battery claimed in claim 1 wherein each said end wall includes first and second electrically conductive pin members extending therethrough, said battery further including first and second connector means for connecting said first and second pin members respectively to the positive and negative electrode plates of the cell stack adjacent one side of said end wall.

4. The modular battery claimed in claim 3 including further connector means for electrically connecting together all said first pin members and for electrically connecting together all said second pin members.

5. The modular battery claimed in claim 3 including further connector means for electrically connecting at least one of said first pin members to a second pin member extending through an end wall other than the end wall through which said one first pin member extends.

6. A modular battery comprising:
    a. a plurality of stack of cells, each cell having a positive electrode plate, a negative electrode plate and a sheet member containing an electrolyte disposed between such electrode plates;
    b. a plurality of nestable means for defining an outermost casing for said battery and for separately containing said cell stacks, each said nestable means comprising an end wall of wall area larger than the area of any one of said cell plates and sheet members, each said end wall supporting first and second pin members extending therethrough, and sidewalls supported on each edge of said end wall and extending beyond both sides thereof, the sidewalls of adjacent of said nestable means being engageable and thereupon defining with the end walls of said adjacent nestable means separate containers for said cell stacks; and c. connector means disposed within each said separate container for connecting the cell positive and negative plates therein respectively to first and second pin members extending through a common one of said end walls.

7. The modular battery claimed in claim 6 including further connector means for electrically connecting together all said first pin members and for electrically connecting together all said second pin members.

8. The modular battery claimed in claim 6 including further connector means for electrically connecting at least one of said first pin members to a second pin member extending through an end wall other than the end wall through which said one first pin member extends.

* * * * *

UNITED STATES PATENT OFFICE
CERTIFICATE OF CORRECTION

Patent No. 3,844,841  Dated October 29, 1974

Inventor(s) Bernard Baker and Martin Klein

It is certified that error appears in the above-identified patent and that said Letters Patent are hereby corrected as shown below:

Title page, item [75], "Bernard Baker, Brookfield, Conn." should read --Bernard Baker, Brookfield Center, Conn., and Martin Klein, Brookfield, Conn.--.

Column 3, line 42, "depend" should read --dependent--.

Signed and sealed this 4th day of February 1975.

(SEAL)
Attest:

McCOY M. GIBSON JR.
Attesting Officer

C. MARSHALL DANN
Commissioner of Patents